US012612107B2

(12) United States Patent
Baba et al.

(10) Patent No.: US 12,612,107 B2
(45) Date of Patent: Apr. 28, 2026

(54) DRIVING SUPPORT DEVICE, DRIVING SUPPORT METHOD, AND STORAGE MEDIUM

(71) Applicant: HONDA MOTOR CO., LTD., Tokyo (JP)

(72) Inventors: Ichiro Baba, Wako (JP); Kento Shirakata, Wako (JP); Shigenobu Saigusa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 100 days.

(21) Appl. No.: 18/603,251

(22) Filed: Mar. 13, 2024

(65) Prior Publication Data

US 2024/0308590 A1     Sep. 19, 2024

(30) Foreign Application Priority Data

Mar. 15, 2023     (JP) ................................. 2023-040624

(51) Int. Cl.
  B62D 15/02      (2006.01)
  G08G 1/16       (2006.01)
(52) U.S. Cl.
  CPC ......... B62D 15/029 (2013.01); B62D 15/025 (2013.01); G08G 1/16 (2013.01)
(58) Field of Classification Search
  CPC .......... G08G 1/16; G08G 1/167; B62D 15/00; B62D 15/02; B62D 15/025; B62D 15/0265; B62D 15/027; B62D 15/029; B60W 30/00; B60W 30/08; B60W 40/00; B60W 40/09
See application file for complete search history.

(56) References Cited

U.S. PATENT DOCUMENTS

| | | | | |
|---|---|---|---|---|
| 9,604,649 B1 * | 3/2017 | Pastor | ................... | B62D 15/00 |
| 2005/0236894 A1 * | 10/2005 | Lu | .......................... | B62D 11/08 |
| | | | | 303/139 |
| 2008/0201039 A1 * | 8/2008 | Matsuoka | ............. | B60W 50/16 |
| | | | | 701/41 |

FOREIGN PATENT DOCUMENTS

| | | |
|---|---|---|
| JP | 2021-062804 | 4/2021 |

* cited by examiner

*Primary Examiner* — Van T Trieu
(74) *Attorney, Agent, or Firm* — Amin, Turocy & Watson, LLP

(57) ABSTRACT

A driving support device includes a determiner that determines that a driver of a mobile body is to be prompted to avoid contact with an object detected by an object detection device whose detection range includes at least an area toward which the mobile body advances by steering and determines a preferred steering direction for avoiding contact with the object and a controller that causes an actuator configured to be able to output a force to a steering operator to vibrate in the preferred steering direction at a frequency of 10 hertz or more and 30 hertz or less upon determining that the driver of the mobile body is to be prompted to avoid contact with the object by steering.

7 Claims, 3 Drawing Sheets

DRIVING SUPPORT DEVICE, DRIVING SUPPORT METHOD, AND STORAGE MEDIUM

CROSS-REFERENCE TO RELATED APPLICATION

Priority is claimed on Japanese Patent Application No. 2023-040624, filed Mar. 15, 2023, the content of which is incorporated herein by reference.

BACKGROUND

Field of the Invention

The present invention relates to a driving support device, a driving support method, and a storage medium.

Description of Related Art

An invention of a contact avoidance support apparatus for a vehicle that supports avoiding contact with obstacles in front has been disclosed in the related art (Japanese Unexamined Patent Application, First Publication No. 2021-62804). This device includes a steering device that includes a steering actuator for steering a steered wheel of a vehicle and steers the steered wheel according to an operation performed on a steering wheel, a relative position acquiring sensor that acquires a relative position of an obstacle with respect to the vehicle, a control device configured to determine whether or not driving operation support for contact avoidance is necessary based on the relative position and perform steering control to control the amount of steering of the steering actuator to avoid contact with the obstacle upon determining that the driving operation support is necessary, and a grip state detection sensor that detects a grip state of the driver on the steering wheel, wherein the control device has a normal mode and a limited mode as control modes for performing steering control and performs steering control selectively in the limited mode based on the grip state.

SUMMARY

In the technology of the related art described above, notification control is performed such that the steering speed in the same direction as a steering direction in the steering control becomes greater than the steering speed in the opposite direction to the steering direction in the steering control. However, it is not clear exactly how much the steering speed is to be increased.

The present invention has been made in view of such circumstances and it is an object of the present invention to provide a driving support device, a driving support method, and a storage medium that can more effectively prompt the driver to perform avoidance steering.

A driving support device, a driving support method, and a storage medium according to the present invention adopt the following configurations.

(1) A driving support device according to an aspect of the present invention includes a storage medium configured to store computer-readable instructions, and a processor connected to the storage medium, the processor executing the computer-readable instructions to determine that a driver of a mobile body is to be prompted to avoid contact with an object detected by an object detection device whose detection range includes at least an area toward which the mobile body advances by steering and determine a preferred steering direction for avoiding contact with the object, and cause an actuator configured to be able to output a force to a steering operator to vibrate in the preferred steering direction at a frequency of 10 hertz or more and 30 hertz or less upon determining that the driver of the mobile body is to be prompted to avoid contact with the object by steering.

(2) In the driving support device according to the above aspect (1), the processor causes the actuator to vibrate by energizing the actuator at a duty ratio of 20% or more and 30% or less.

(3) In the driving support device according to the above aspect (1), the processor causes the actuator to vibrate at a frequency of 20 hertz.

(4) In the driving support device according to the above aspect (1), the processor further determines a target steering angle for avoiding contact with the object, and when an absolute value of a difference between an actual steering angle of the mobile body and the target steering angle is a predetermined angle or more, determines that the driver of the mobile body is to be prompted to avoid contact with the object by steering.

(5) In the driving support device according to the above aspect (1), the processor causes the actuator to vibrate again after a predetermined period of time elapses when the driver has not operated the steering operator after vibrating the actuator.

(6) A driving support method according to another aspect of the present invention includes, by a driving support device, determining that a driver of a mobile body is to be prompted to avoid contact with an object detected by an object detection device whose detection range includes at least an area toward which the mobile body advances by steering and determining a preferred steering direction for avoiding contact with the object, and causing an actuator configured to be able to output a force to a steering operator to vibrate in the preferred steering direction at a frequency of 10 hertz or more and 30 hertz or less upon determining that the driver of the mobile body is to be prompted to avoid contact with the object by steering.

(7) A storage medium according to another aspect of the present invention is a computer-readable non-transitory storage medium storing a program causing a processor of a driving support device to determine that a driver of a mobile body is to be prompted to avoid contact with an object detected by an object detection device whose detection range includes at least an area toward which the mobile body advances by steering and determine a preferred steering direction for avoiding contact with the object, and cause an actuator configured to be able to output a force to a steering operator to vibrate in the preferred steering direction at a frequency of 10 hertz or more and 30 hertz or less upon determining that the driver of the mobile body is to be prompted to avoid contact with the object by steering.

According to the above aspects (1) to (7), it is possible to more effectively prompt the driver to perform avoidance steering.

DETAILED DESCRIPTION OF THE INVENTION

Hereinafter, embodiments of a driving support device, a driving support method, and a storage medium of the present invention will be described with reference to the drawings. A driving support device is a device that supports driving of a mobile body. "Mobile body" refers to a structure that can move by its own drive mechanism such as a vehicle, micro-mobility, an autonomous mobile robot, a ship, or a drone. In the following description, it is assumed that a mobile body is a vehicle that moves on the ground and configurations and functions for allowing a vehicle to move on the ground will be described mainly.

First Embodiment

Figure 1:
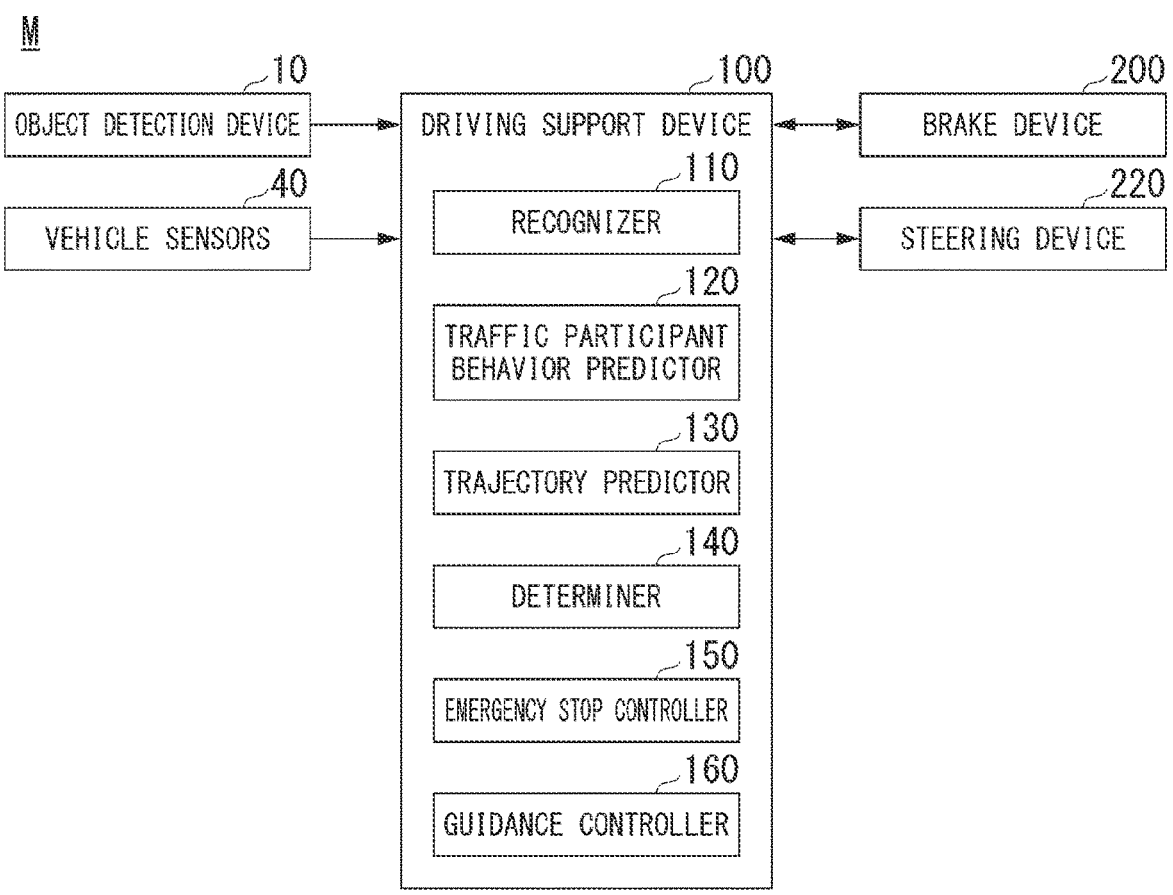
FIG. 1 is a configuration diagram centered on a driving support device according to a first embodiment.

FIG. 1 is a configuration diagram centered on a driving support device 100 according to a first embodiment. The driving support device 100 is mounted in a vehicle. For example, an object detection device 10, vehicle sensors 40, a brake device 200, and a steering device 220 are mounted in the vehicle (hereinafter referred to as a "vehicle M") in addition to the driving support device 100. The components shown in FIG. 1 are merely an example and some of the components may be omitted or other components may be added. Although the vehicle M includes a driving force output device such as an engine or a driving motor, illustrations and descriptions thereof will be omitted.

The object detection device 10 includes, for example, some or all of a camera, a radar device, a light detection and ranging (LIDAR) device, and a sensor fusion device. The object detection device 10 is a device for detecting objects with a detection range including at least an area toward which the vehicle M advances. The camera is, for example, a digital camera using a solid-state imaging device such as a charge coupled device (CCD) or a complementary metal oxide semiconductor (CMOS). The camera is attached to the vehicle M at an arbitrary location. For imaging the area in front of the vehicle M, the camera is attached to an upper portion of a front windshield, a rear surface of a rearview mirror, or the like. For example, the camera repeats imaging of the surroundings of the vehicle M at regular intervals. The camera may also be a stereo camera or a ranging sensor. The radar device radiates radio waves such as millimeter waves around the vehicle M and detects radio waves reflected by an object (reflected waves) to detect at least the position (distance and orientation) of the object. The radar device may detect the position and speed of an object using a frequency modulated continuous wave (FM-CW) method. The LIDAR device illuminates the surroundings of the vehicle M with light (electromagnetic waves with a wavelength close to those of visible light) and measures scattered light. The LIDAR device detects the distance to a target based on a period of time from when light is emitted to when light is received. The radiated light is, for example, pulsed laser light. The sensor fusion device performs a sensor fusion process on results of detection by some or all of the camera, the radar device, and the LIDAR device to recognize the position, type, speed, or the like of the object. The object detection device 10 may include an image analysis device that mainly performs image analysis of the camera instead of the sensor fusion device. This image analysis device may be one function of the driving support device 100. The object detection device 10 outputs the recognition result to the driving support device 100.

The vehicle sensors 40 include a vehicle speed sensor that detects the speed of the vehicle M, an acceleration sensor that detects the acceleration thereof, a yaw rate sensor that detects an angular speed thereof about the vertical axis, an orientation sensor that detects the orientation of the vehicle M, or the like.

The brake device 200 and the steering device 220 will be described before describing the driving support device 100.

The brake device 200 includes, for example, a brake caliper, a cylinder that transmits hydraulic pressure to the brake caliper, an electric motor that generates hydraulic pressure in the cylinder, and a brake ECU. The brake ECU controls the electric motor according to information input from the driving support device 100 or information input from the driving operators (not shown) such that a brake torque corresponding to a braking operation is output to each wheel. The brake device 200 may include, as a backup, a mechanism for transferring a hydraulic pressure generated by an operation of a brake pedal to the cylinder via a master cylinder. The brake device 200 is not limited to that configured as described above and may be an electronically controlled hydraulic brake device that transmits the hydraulic pressure of the master cylinder to the cylinder.

Figure 2:
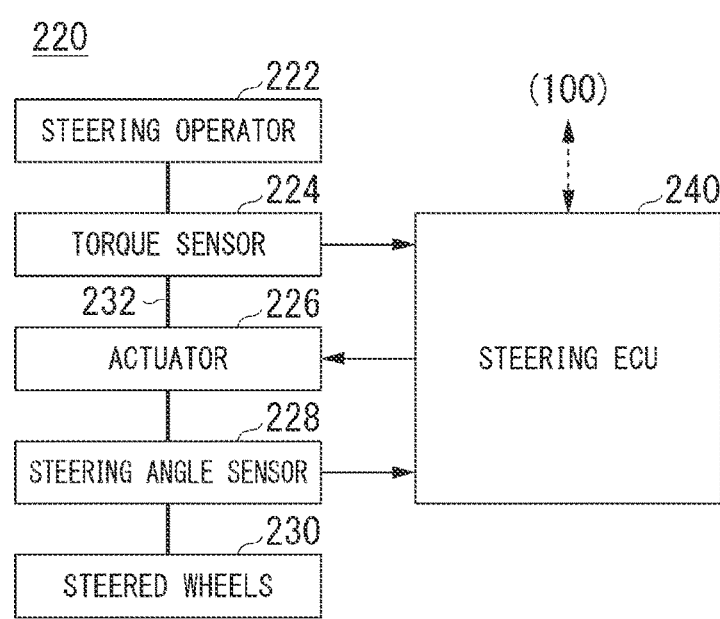
FIG. 2 is a configuration diagram of a steering device.

FIG. 2 is a configuration diagram of the steering device 220. The steering device 220 includes, for example, a steering operator 222, a torque sensor 224, an actuator 226, a steering angle sensor 228, and steered wheels 230. These components are mechanically connected by a connecting portion 232 that includes a steering shaft, a gear mechanism, and the like. The connecting portion 232 may have a function of temporarily releasing the connection. The steering device 220 may also include a steering electronic controller (ECU) 240. The steering device 220 may be a so-called steer-by-wire steering device which has no mechanical connection between the steering operator 222 and the steered wheels 230.

The steering operator 222 is, for example, a steering wheel. Alternatively, the steering operator 222 may be a deformed steering wheel, a joystick, a lever, a cross key, or another steering operator. In the following description, it is assumed that the steering operator 222 is a steering wheel. The steering operator 222 transmits a rotational force (hereinafter referred to as a torque, and if the steering operation is not a rotational operation, a "force" in the present invention is not limited to a torque) to the connecting portion 232 when it is rotated. At least a part of the connecting portion 232 operates as a rotating shaft. The torque sensor 224 detects a torque applied to the steering operator 222 and outputs the detected torque to the steering ECU 240. The actuator 226 is, for example, a motor whose stator is connected to the vehicle body and whose rotor rotates together with the connecting portion 232. The actuator 226 outputs a force to the connecting portion 232 in response to an instruction from the steering ECU 240 to realize a so-called power steering function. When the actuator 226 outputs a torque to the connecting portion 232, the torque is also transmitted to the steering operator 222. The output of a small torque from the actuator 226 allows vibrations to be transmitted to the hands of the driver of the vehicle M, providing some awareness. The actuator 226 may also operate to apply a reactive force against the torque applied to the steering operator 222, suppressing the steering operation. This realizes driving support such as a lane keeping assist system (LKAS). The actuator for realizing the power steering function and the actuator for outputting the reactive force may be provided separately, but here, they are expressed as a single unit. The steering angle sensor 228 detects the rotation angle (steering angle) of the steered wheels 230 and outputs the detected rotation angle to the steering ECU 240. The steering ECU 240 operates the actuator 226 based on information input from the torque sensor 224 and the steering angle sensor 228 or in response to an instruction from the driving support device 100.

Returning to FIG. 1, the driving support device 100 includes, for example, a recognizer 110, a traffic participant behavior predictor 120, a trajectory predictor 130, a determiner 140, an emergency stop controller 150, and a guidance controller 160. These components are realized, for example, by a hardware processor such as a central processing unit (CPU) executing a program (software). Some or all of these components may also be realized by hardware (including circuitry) such as large scale integration (LSI), an application specific integrated circuit (ASIC), a field-programmable gate array (FPGA), or a graphics processing unit (GPU) or may be realized by hardware and software in cooperation. The program may be stored in advance in a storage device such as an HDD or a flash memory (a storage device having a non-transitory storage medium) of the driving support device 100 or may be stored in a detachable storage medium such as a DVD or a CD-ROM and then installed in the HDD or flash memory of the driving support device 100 by mounting the storage medium (the non-transitory storage medium) in a drive device.

The recognizer 110 recognizes states such as the type, position, speed and acceleration of each object present near the vehicle M based on information input from the object detection device 10. The position of the object is recognized, for example, as a position in an absolute coordinate system whose origin is at a representative point on the vehicle M (such as the center of gravity or the center of a drive shaft thereof), and used for control. The position of the object may be represented by a representative point on the object such as the center of gravity or a corner thereof or may be represented by an expressed region. The "states" of the object may include an acceleration or jerk of the object or a "behavior state" thereof (for example, whether or not the object is changing or is going to change lanes). In this manner, the recognizer 110 recognizes an object that is present at least in an area toward which the vehicle M advances and that the vehicle M is to avoid contact with.

The recognizer 110 recognizes, for example, a lane in which the vehicle Mis traveling (a travel lane). For example, the recognizer 110 recognizes the position or attitude of the vehicle M with respect to the travel lane. For example, the recognizer 110 may recognize both a deviation from the lane center of the reference point of the vehicle M and an angle formed by the travel direction of the vehicle M relative to an extension line of the lane center as the relative position and attitude of the vehicle M with respect to the travel lane. Alternatively, the recognizer 110 may recognize the position of the reference point of the vehicle M with respect to one of the sides of the travel lane (a road lane line or a road boundary) or the like as the relative position of the vehicle M with respect to the travel lane.

The traffic participant behavior predictor 120 predicts the future behavior of objects (a traffic participants) that are present on a travel lane or an adjacent lane adjacent to the travel lane and move by themselves among the objects recognized by the recognizer 110. The traffic participants include other vehicles, pedestrians, bicycles, and the like.

For example, the traffic participant behavior predictor 120 may predict the future behavior of each traffic participant based on a past movement history of the traffic participant under an assumption such as that its speed is constant or its acceleration is constant or may predict the future behavior of each traffic participant using a method such as a Kalman filter. The traffic participant behavior predictor 120 may also predict the future behavior of each traffic participant taking into account the orientation of the traffic participant (the orientation of a vehicle body axis when the traffic participant is a vehicle and the orientation of a face when the traffic participant is a pedestrian). The future behavior means, for example, the positions of the traffic participant at a plurality of future time points.

Further, the traffic participant behavior predictor 120 may set a risk which is an index value indicating the degree to which the vehicle M is not to enter or approach a corresponding area in an assumed plane S that represents a space around the vehicle M as a two-dimensional plane viewed from above based on the predicted future behavior of traffic participants or the like. Namely, the risk indicates the probability of presence of an object (including not only a traffic participant but also a non-travelable area such as a road shoulder, a guardrail, and an area outside a white line), which may not be a "probability" in the strict sense. The larger the value of the risk, the more the vehicle M is not to enter or approach the corresponding area and the closer the value is to zero, the more favorable it is for the vehicle M to travel. However, this relationship may be reversed.

The traffic participant behavior predictor 120 also sets the risk in the assumed plane S at each future time point defined at a constant time interval such as the current time t, after Δt (time t+Δt), after 2Δt (time t+2Δt), and so on.

Figure 3:
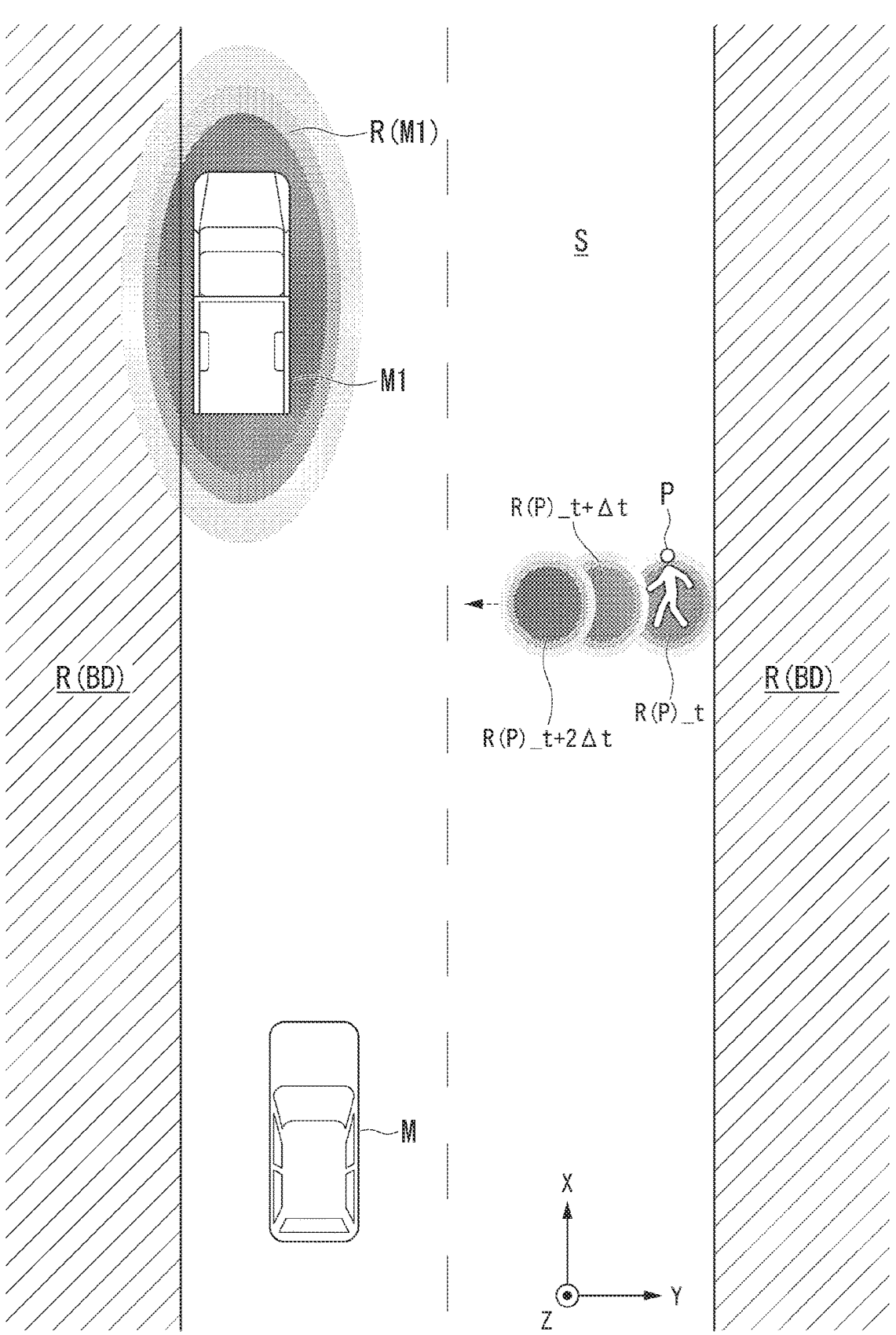
FIG. 3 is a diagram showing an overview of a risk set by a traffic participant behavior predictor.

FIG. 3 is a diagram showing an overview of the risk set by the traffic participant behavior predictor 120. The traffic participant behavior predictor 120 sets a risk with contour lines of an ellipse or a circle in the assumed plane S for each traffic participant based on its travel direction and speed and sets a risk with a certain value for non-travelable areas. In FIG. 3, R(M1) is the risk of a stopped vehicle M1 and R(P) is the risk of a pedestrian P. Since the pedestrian P is moving in a direction of crossing a road, its risk is set for each future time point at a different position from the current time. The same applies to moving vehicles, bicycles, and the like. R(BD) is the risk of a non-travelable area BD. In FIG. 3, the density of hatching indicates the value of the risk, and the darker the hatching, the greater the risk. The traffic participant behavior predictor 120 may also set the risk such that its value increases as the distance from the center of a lane increases. The traffic participant behavior predictor 120 may also simply predict the positions of each traffic participant at a plurality of future time points without setting such a risk.

The trajectory predictor 130 inputs the speed VM of the vehicle M detected by the vehicle speed sensor included in the vehicle sensors 40 and the steering angle θM of the vehicle M detected by the steering angle sensor 228 of the steering device 220 into a vehicle body model (such as an arc model or a two-wheel model) to predict the trajectory of the vehicle M over a certain period of time in the future. Since various methods are known for vehicle body models, detailed descriptions thereof will be omitted.

The determiner 140 refers to the processing results of the traffic participant behavior predictor 120 and the trajectory predictor 130 and determines whether or not it is difficult to avoid contact with an object recognized by the recognizer 110 by steering (avoidance steering). For example, the determiner 140 determines that the avoidance steering is difficult when a time to collision (TTC) with an object is a threshold value or less or when a lateral acceleration during avoidance behavior when an avoidance trajectory that can avoid contact has been generated exceeds an upper limit. Upon determining that the avoidance steering is difficult, the determiner 140 activates the emergency stop controller 150. In response to this, the emergency stop controller 150 instructs the brake device 200 to stop the vehicle M.

Upon determining that the avoidance steering is not difficult, the determiner 140 determines that the driver of the vehicle M is to be prompted to perform avoidance steering and determines a preferred steering direction (in which direction to steer) and a target steering angle for the avoidance steering. The determiner 140 may determine the preferred steering direction based on whether the object to be avoided is on the left or right side of the trajectory of the vehicle M predicted by the trajectory predictor 130 or may determine the preferred steering direction further taking into account which lateral position in the lane the vehicle M is moving. There are no particular restrictions on the method of determining the preferred steering direction and the preferred steering direction may be determined using any method. In determining the target steering angle, the determiner 140, for example, gives a provisional steering angle θM to the trajectory predictor 130 and searches for a steering angle θM until a risk for a trajectory for the vehicle M output by the trajectory predictor 130 becomes equal to or less than a predetermined value. At this time, the determiner 140 may generate a path plan that the steering angle changes midway through and set a steering angle at the frontmost of the path plan as the target steering angle. Then, the determiner 140 determines that the driver of the vehicle M is to be prompted to perform avoidance steering when the absolute value of the difference between the actual steering angle and the target steering angle of the vehicle M is a predetermined angle (for example, about 15 degrees) or more.

When the determiner 140 has determined that the driver is to be prompted to avoid contact with the object by steering, the guidance controller 160 performs guidance control to control the actuator 226 via the steering ECU 240 as follows.

Figure 4:
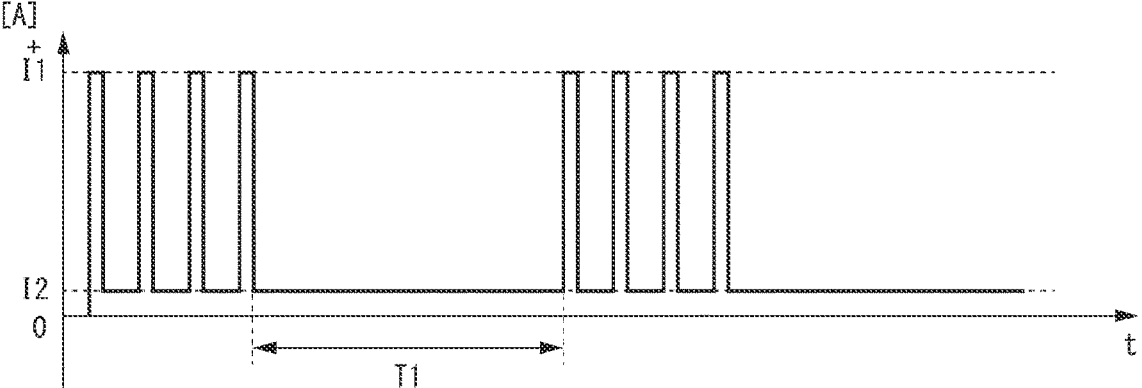
FIG. 4 is a diagram for explaining details of control of an actuator by a guidance controller and effects given to a driver.

FIG. 4 is a diagram for explaining details of control of the actuator 226 by the guidance controller 160 and effects given to the driver. In the following description, it is assumed that the direction of current for operating the actuator 226 in the same direction as a preferred steering direction out of the operating directions of the steering operator 222 is positive and the opposite direction is negative.

The guidance controller 160 oscillates the current flowing through the actuator 226 between I2 A and I2 A to vibrate the actuator 226 (more precisely, vibrate an output portion of the actuator 226 connected to the steering operator 222). I2 A is a basic current for outputting a reactive force at a level that does not cause automatic steering by itself. According to human sensory feedback tests, the frequency at which the current is oscillated is preferably 10 hertz or more and 30 hertz or less, and more preferably about 20 hertz. The duty ratio is preferably set to 20% or more and 30% or less. It has been found that doing so can effectively encourage the driver's initiative steering operation while keeping the output at a level that does not cause automatic steering. The magnitude of I1 A may be arbitrarily determined based on the rating of the actuator 226 or the like.

When the driver has not operated the steering operator 222 in the preferred steering direction after vibrating the actuator 226 as described above, the guidance controller 160 causes the actuator 226 to vibrate again after a predetermined period of time T1 (for example, about several hundred ms) elapses.

Figure 5:
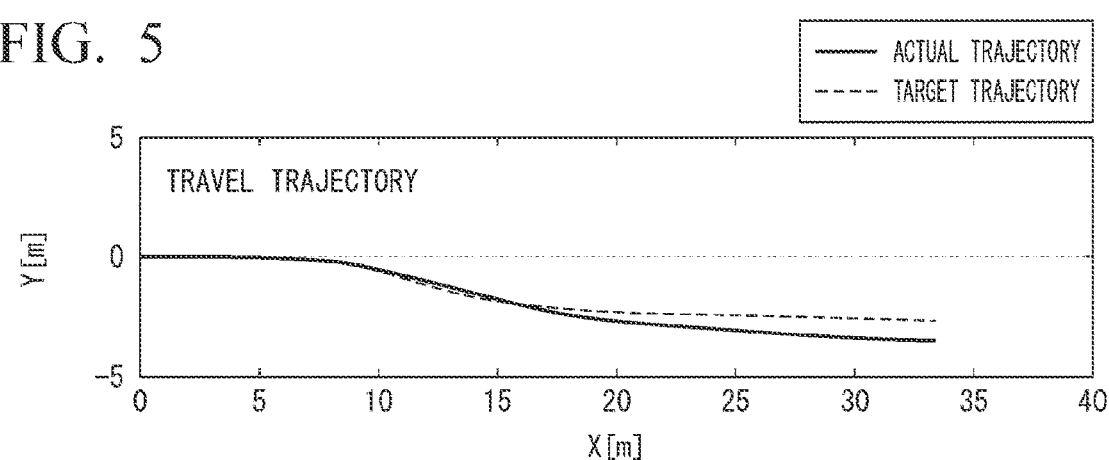
FIG. 5 is a diagram showing the results of verifying the degree of travel trajectory following.
Figure 6:
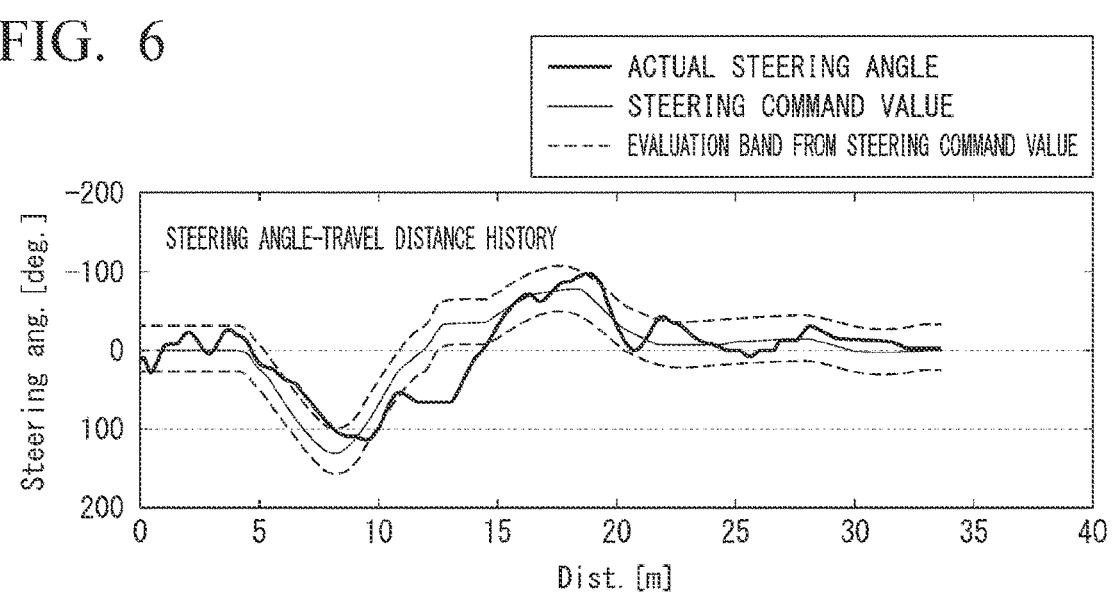
FIG. 6 is a diagram showing the results of verifying the degree of steering angle following.

The inventor of this application conducted subject tests to verify the effectiveness of the invention. The subject tests were conducted at a frequency of 20 hertz at which the current was oscillated. FIG. 5 shows the results of verifying the degree of travel trajectory following and FIG. 6 shows the results of verifying the degree of steering angle following. In FIG. 5, an actual trajectory is a trajectory that the vehicle M actually traveled under the support operation of the driving support device 100 and a target trajectory is that of the path plan described above. In FIG. 6, an actual steering angle is an operating angle of the steering operator 222 as a result of the driver's operation under the support operation of the driving support device 100 and a steering command value is an operating angle of the steering operator 222 in accordance with the path plan. An evaluation band from the steer command value is a band of plus or minus 30 degrees from the steer command value. As a result of the verification, it was found that the actual steering angle was within the evaluation band with a probability of about 80%. Feedback from subjects was obtained stating, for example, that the vibration of the steering operator 222 made them feel the need for steering, that they were able to understand the system's intention in cases of simple trajectories, and that the vibration did not impair their driving feeling.

According to the embodiment described above, by vibrating the actuator 226 in a preferred steering direction at a frequency of 10 hertz or more and 30 hertz or less, it is possible to more effectively prompt the driver to perform avoidance steering.

The driving support device may not include an emergency stop controller and may only perform avoidance trajectory generation and guidance control. The driving support device may be configured as a part of the automated driving control device (as one that operates mainly during a manual driving period).

Although the modes for carrying out the present invention have been described above by way of embodiments, the present invention is not limited to these embodiments at all and various modifications and substitutions can be made without departing from the gist of the present invention.

What is claimed is:

1. A driving support device comprising:
a storage medium configured to store computer-readable instructions; and
a processor connected to the storage medium, the processor executing the computer-readable instructions to:
determine that a driver of a mobile body is to be prompted to avoid contact with an object detected by an object detection device whose detection range includes at least an area toward which the mobile body advances by steering and determine a preferred steering direction for avoiding contact with the object; and
cause an actuator configured to be able to output a force to a steering operator to vibrate in the preferred steering direction at a frequency of 10 hertz or more and 30 hertz or less by oscillating current flowing through the actuator between a first current value and a second current value upon determining that the driver of the mobile body is to be prompted to avoid contact with the object by steering, the first current value being determined based on a rating of the actuator, and the second current value being current for outputting a reactive force at a level that does not cause automatic steering by itself.

2. The driving support device according to claim 1, wherein the processor causes the actuator to vibrate by energizing the actuator at a duty ratio of 20% or more and 30% or less.

3. The driving support device according to claim 1, wherein the processor causes the actuator to vibrate at a frequency of 20 hertz.

4. The driving support device according to claim 1, wherein the processor further determines a target steering angle for avoiding contact with the object, and when an absolute value of a difference between an actual steering angle of the mobile body and the target steering angle is a predetermined angle or more, determines that the driver of the mobile body is to be prompted to avoid contact with the object by steering.

5. The driving support device according to claim 1, wherein the processor causes the actuator to vibrate again after a predetermined period of time elapses when the driver has not operated the steering operator after vibrating the actuator.

6. A driving support method comprising:

by a driving support device, determining that a driver of a mobile body is to be prompted to avoid contact with an object detected by an object detection device whose detection range includes at least an area toward which the mobile body advances by steering and determining a preferred steering direction for avoiding contact with the object; and causing an actuator configured to be able to output a force to a steering operator to vibrate in the preferred steering direction at a frequency of 10 hertz or more and 30 hertz or less by oscillating current flowing through the actuator between a first current value and a second current value upon determining that the driver of the mobile body is to be prompted to avoid contact with the object by steering, the first current value being determined based on a rating of the actuator, and the second current value being current for outputting a reactive force at a level that does not cause automatic steering by itself.

7. A computer-readable non-transitory storage medium storing a program causing a processor of a driving support device to:

determine that a driver of a mobile body is to be prompted to avoid contact with an object detected by an object detection device whose detection range includes at least an area toward which the mobile body advances by steering and determine a preferred steering direction for avoiding contact with the object; and cause an actuator configured to be able to output a force to a steering operator to vibrate in the preferred steering direction at a frequency of 10 hertz or more and 30 hertz or less by oscillating current flowing through the actuator between a first current value and a second current value upon determining that the driver of the mobile body is to be prompted to avoid contact with the object by steering, the first current value being determined based on a rating of the actuator, and the second current value being current for outputting a reactive force at a level that does not cause automatic steering by itself.

* * * * *